United States Patent Office 3,326,984
Patented June 20, 1967

3,326,984
PERFLUORODIVINYL ETHER
Daniel G. Anderson and Stanley Selman, Wilmington, Del., assignors to E. I. du Pont de Nemours and Company, Wilmington, Del., a corporation of Delaware
No Drawing. Filed Apr. 28, 1965, Ser. No. 452,459
4 Claims. (Cl. 260—614)

This invention relates to a new composition of matter and a process for its preparation. More specifically, the invention concerns perfluorodivinyl ether and its preparation.

Interest in divinyl ethers and particularly in fluorinated divinyl ethers has arisen because of their potential as a source of polymeric materials. U.S. Patent 3,114,778 to Fritz et al. describes the preparation of such ethers by reacting hexafluoropropylene epoxide with each acid fluoride group of a fluorinated alkandioic diacid fluoride. The resultant etherified diacid fluoride is then converted by pyrolysis to a divinyl ether. Such ethers inherently contain at least two oxygen atoms. Heretofore, perfluorinated divinyl ether in which each vinyl group is attached to the same ethereal oxygen atom, i.e., a monoether of the formula $CF_2=CF-O-CF=CF_2$, has not been prepared.

The present invention provides for the first time perfluorodivinyl ether. This compound is made by a series of steps, the first of which is contacting and reacting perfluoromalonyl fluoride and hexafluoropropylene epoxide under substantially anhydrous conditions in substantially equi-molar proportions in a polar solvent and in contact with a catalytic amount of an alkali metal or quaternary ammonium alkoxide formed from perfluoromalonyl fluoride, and obtaining as a result thereof the acid fluoride, perfluoro-2-methyl-3-oxa-adipoyl fluoride. This reaction proceeds as follows:

(1)

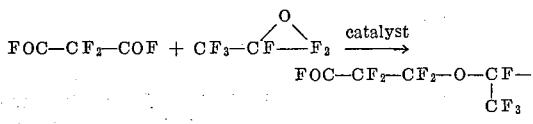

Surprisingly, the acid fluoride intermediate can be converted to perfluorodivinyl ether by pyrolysis in contact with either alkali metal carbonate or zinc oxide according to the following reaction:

(2)

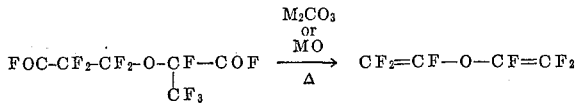

wherein M is alkali metal or zinc. Alternatively, the acid fluoride intermediate is reacted with aqueous alkali metal hydroxide to form the corresponding carboxylic acid salt which is then dried and pyrolyzed according to the following reaction sequence:

(3)

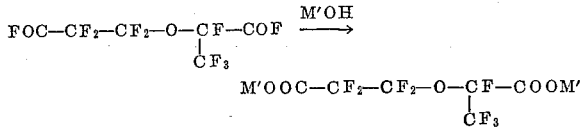

(4)

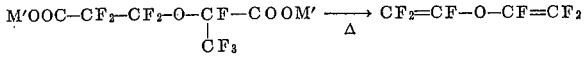

wherein M' is alkali metal. Pyrolysis, as used herein, means heating the compound to cause its decomposition in the substantial absence of oxygen and water.

The reaction of hexafluoropropylene epoxide with perfluoromalonyl fluoride is carried out in substantially a 1:1 molar ratio in the presence of the alkoxide catalyst and in a polar solvent. Suitable inert polar solvents include the dimethyl ethers of ethylene glycol and diethylene glycol, benzonitrile, acetonitrile, and the like. Thus, the solvents employable include polyalkyl ethers and hydrocarbon nitriles, liquid at reaction conditions. Other polar solvents which have no active hydrogen are also useful. These include dimethyl sulfoxide and N-methyl pyrrolidone.

The alkoxide catalyst can be added to the reaction system as the compound, or it can be prepared in situ from the perfluoromalonyl fluoride present in the reaction system by adding thereto small amounts of the fluoride of either an alkali metal or quaternary ammonium. While it has been previously believed that these fluorides are themselves catalysts, it has been found that in the present reaction system these fluorides react with perfluoromalonyl fluoride to form the corresponding alkoxide before reaction between the remaining perfluoromalonyl fluoride with the epoxide occurs and therefore, that the alkoxide is the catalyst. Alkali metal perfluoroalkoxides other than the alkoxide just described can be added to the reaction system in catalytic amounts instead of alkali metal or quaternary ammonium fluoride to form the alkoxide of perfluoromalonyl fluoride. In this instance, the alkali metal is preferably of atomic number 19 or more. In general, the concentration of alkoxide catalyst is about 0.1 to 5.0% by weight of the weight of the hexafluoropropylene epoxide reactant. The fluorides or alkoxides used to form the desired catalyst in situ are added in molar amounts corresponding to these weight percentages. The alkoxide catalyst is predominantly a monoalkoxide because of the large excess of perfluoromalonyl fluoride present, but some dialkoxide can be present. Examples of such fluorides or perfluoroalkoxides include cesium fluoride, sodium fluoride, tetra- lower alkyl, e.g., methyl or ethyl, ammonium fluoride, cesium perfluoromethoxide, potassium perfluoromethoxide, and potassium perfluoropropoxide.

Reaction temperatures for the reaction between hexafluoropropylene epoxide and perfluoromalonyl fluoride are not critical, and in general, can be varied from −80° C. to 200° C., although a preferred range is from about −30° C. to 100° C. Nor is pressure critical, and pressures ranging from subatmospheric to superatmospheric may be employed.

In the pyrolysis step, the adipoyl fluoride can be converted to the dialkali metal salt simply by treating the fluoride with an alkali metal hydroxide solution, such as potassium or sodium hydroxide. Alternatively, the adipoyl fluoride can first be hydrolyzed with water, separated and neutralized with the hydroxide; or it can be converted to the diester and then treated with the hydroxide. The dialkali metal salt can be pyrolyzed, after drying, at temperatures of from about 200° C. to 300° C., and preferably in the range of 250° C. to 270° C. Alternatively, the pyrolysis can be carried out in the presence of the above-mentioned inert polar solvents at temperatures ranging from about 100° C. to 200° C.

Preferably, however, the pyrolysis is carried out simply by passing gaseous adipoyl fluoride over a bed of an alkali metal carbonate or zinc oxide in the substantial absence of water and oxygen and at temperatures of 250° C. to 350° C. Regardless of which procedure is employed the alkali metal carbonate or zinc oxide is present in at least a stoichiometric amount; when the bed method is employed, the amount will be far in excess of that required by stoichiometry.

The invention is further illustrated by the following examples.

Example I

To an evacuated, round bottom flask charged with 7 gm. (0.057 mole) of cesium fluoride and 50 ml. of dry diethyl ether of diethylene glycol (diglyme), and cooled to −78° C. is added 120 gm. (0.83 mole) of perfluoromalonyl fluoride. The reaction flask is then immersed in an ice bath at which temperature the pressure in the system rises from 29 in. in vacuum to 15 in. in vacuum. Hexafluoropropylene epoxide is slowly metered into the system through a manifold at 10 to 0 p.s.i. until 131 gm. (0.79 mole) has been added. The reaction mixture forms two layers. The lower layer (the fluorocarbon layer) is withdrawn from the mixture, and the upper layer (the diglyme layer) is heated at about 130° C. to free any adduct present as alkoxide. The adduct obtained from this heating is combined with the original fluorocarbon layer and the combined portions distilled through a 3 ft. stainless steel helices packed column to give 175 gm. (72% yield) of perfluoro-2-methyl-3-oxaadipoyl fluoride, B.P. 63–65° C.

Analysis.—Calc'd. for $C_6F_{10}O_3$: C, 23.2; H, 0.0; F, 61.3. Found: C, 23.76; H, 0.35; F, 61.25.

Similar results are obtained when the fluorides of quaternary ammonium or alkali metal other than cesium is used. The same is true when alkali metal perfluoroalkoxides are used.

Example II 40 gm. (0.13 mole) of perfluoro-2-methyl-3-oxa-adipoyl fluoride and 12 gm. (0.39 mole) of anhydrous methanol are stirred at −78° C. under anhydrous conditions to prepare the dimethyl ester of the adipoyl fluoride. Excess methanol and hydrogen fluoride are removed from the mixture by evacuation at 2 mm. Hg at room temperature. The resulting solution is titrated to the phenolphthalein end point with 5 N-methanolic potassium hydroxide solution (52 ml. 0.26 mole). The excess methanol is removed by vacuum distillation at 2 mm. Hg at 100° C. to give 40.0 gm. (0.11 mole) of the dipotassium salt of perfluoro-2-methyl-3-oxaadipic acid. This salt is pyrolized in a stainless steel pot at 260° C. and after removal of carbon dioxide by evaporation amounts to 12.8 gm. A gas chromatogram of the product mixture shows 14 peaks, the two major peaks being about 70% of the total. The product is passed through a preparative scale gas chromatography unit and a major component is isolated and assigned the structure, $CF_2=CF-O-CF=CF_2$, based on its infrared and nuclear magnetic resonance spectra.

The infrared spectrum of perfluorodivinyl ether is characterized by major absorption bands at 5.4, 7.5, doublet at 7.75 and 7.9, 8.5 with shoulder at 8.65, 9.05, 9.3, and 9.7 $\mu$. The $F^{19}$ nuclear magnetic resonance spectrum of this compound exhibits two groups of resonances of areas in the ratio of 2/1. The larger multiplet ($CF_2$ group) is centered at 127.5 p.p.m. high field relative to $CCl_3F$ standard; the smaller multiplet (CF group) is centered at 144 p.p.m. high field relative to the $CCl_3F$ standard.

Example III

A stainless tube containing 100 gm. of anhydrous sodium carbonate is heated to 220° C. and maintained free of oxygen and water by passage of a stream of nitrogen through the tube. To the nitrogen stream is slowly added 8.0 gm. of perfluoro-2-methyl-3-oxaadipoyl fluoride over a period of one hour. The volatile products are trapped in a dry ice cooled trap downstream from the tube. There is obtained 1.5 gm. of volatile material containing about 1.2 gm. of perfluorodivinyl ether (41% yield). Zinc oxide and other alkali metal carbonates give similar results when used in place of sodium carbonate in this example.

The hexafluoropropylene epoxide employed as a reactant is prepared by the oxidation of hexafluoropropylene using alkaline aqueous hydrogen peroxide.

The perfluoromalonyl fluoride employed as a reactant is prepared by heating 178 gm. (1.0 mole) of β-methoxyperfluoropropionyl fluoride (prepared by the method of Fawcett, J. Am. Chem. Soc., 84, 4280 (1962)), and 189 gm. (1.5 mole) of titanium tetrafluoride in a 2230 ml. stainless steel cylinder (in an oil bath in a barricade) at 175° for 72 hours. The cylinder is allowed to cool to room temperature and the volatile gases are transferred under a nitrogen atmosphere to a round bottom flask immersed in a dry ice-methanol bath and connected to a low temperature still. Distillation affords 111 gm. 77% yield, of perfluoromalonyl fluoride, B.P. −9° C.

The perfluorodivinyl ether of this invention can be homopolymerized or copolymerized with other ethylenically unsaturated compounds to produce high molecular weight polymers. The polymerizations can be carried out by conventional procedures such as described in U.S. 2,952,669. The perfluorodivinyl ether of this invention can be used as a low temperature, e.g., −50° C. to 0° C., dielectric liquid. At higher temperatures, e.g., 100° C. and above, the ether becomes a reactive intermediate having many of the uses of known ethers.

The foregoing detailed description has been given for clearness of understanding only and no unnecessary limitations are to be understood therefrom. The invention is not limited to the exact details shown and described, for obvious modifications will occur to those skilled in the art.

What is claimed is:
1. Perfluorodivinyl ether.
2. A process which comprises reacting perfluoromalonyl fluoride with hexafluoropropylene epoxide under substantially anhydrous conditions in substantially equimolar proportions in an inert polar solvent containing a catalytic amount of an alkoxide of per-fluoromalonyl fluoride selected from the group consisting of alkali metal and quaternary ammonium to obtain the acid fluoride, perfluoro-2-methyl-3-oxaadipoyl fluoride of the formula

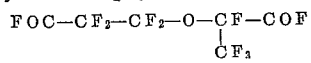

pyrolizing the acid fluoride of said formula at a temperature in the range of 100 to 350° C. in contact with a compound selected from the group consisting of alkali metal carbonate and zinc oxide, and obtaining as a result thereof perfluorodivinyl ether.

3. The process as recited in claim 2 wherein said alkoxide is prepared by adding a catalytic amount of alkali metal fluoride to said solvent containing said perfluoromalonyl fluoride.

4. The process as recited in claim 2 wherein said inert polar solvent is polyalkyl ether, hydrocarbon nitrile, dimethyl sulfoxide, or N-methyl pyrrolidone.

References Cited

UNITED STATES PATENTS

| | | | |
|---|---|---|---|
| 2,917,548 | 12/1959 | Dixon | 260—614 |
| 3,114,778 | 12/1963 | Fritz et al. | 260—614 |
| 3,180,895 | 4/1965 | Harris et al. | 260—614 |

OTHER REFERENCES

Dixon, German application, 1,145,166, printed March 14, 1963 (KL 120 19/03).

LEON ZITVER, Primary Examiner.

CARL D. QUARFORTH, Examiner.

L. A. SEBASTIAN, H. T. MARS, Assistant Examiners.